(12) United States Patent
Su et al.

(10) Patent No.: US 11,862,836 B2
(45) Date of Patent: Jan. 2, 2024

(54) RADIO UNIT FOR UNSYNCHRONIZED TDD MULTI-BAND OPERATION

(71) Applicant: Telefonaktiebolaget LM Ericsson (publ), Stockholm (SE)

(72) Inventors: Youping Su, Täby (SE); Jichang Liao, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 548 days.

(21) Appl. No.: 17/272,237

(22) PCT Filed: Aug. 27, 2018

(86) PCT No.: PCT/SE2018/050858
§ 371 (c)(1),
(2) Date: Feb. 26, 2021

(87) PCT Pub. No.: WO2020/046180
PCT Pub. Date: Mar. 5, 2020

(65) Prior Publication Data
US 2021/0399395 A1    Dec. 23, 2021

(51) Int. Cl.
*H01P 1/213* (2006.01)
*H01P 5/12* (2006.01)
*H04L 5/14* (2006.01)

(52) U.S. Cl.
CPC ............ *H01P 1/2138* (2013.01); *H01P 5/12* (2013.01); *H04L 5/14* (2013.01)

(58) Field of Classification Search
CPC ............ H01P 1/2138; H01P 5/12; H04L 5/14

USPC .......................................................... 370/280
See application file for complete search history.

(56) References Cited

U.S. PATENT DOCUMENTS

| 2015/0002240 A1 | 1/2015 | Reiha et al. |
| 2015/0035617 A1* | 2/2015 | Leipold ............... H03F 1/565 333/132 |
| 2015/0084718 A1 | 3/2015 | Maxim et al. |
| 2016/0359510 A1 | 12/2016 | Scott et al. |

(Continued)

OTHER PUBLICATIONS

International Search Report and Written Opinion for International Application No. PCT/SE2018/050858, dated Apr. 26, 2019, 11 pages.

(Continued)

*Primary Examiner* — Intekhaab A Siddiquee
(74) *Attorney, Agent, or Firm* — Nicholson De Vos Webster & Elliott LLP

(57) ABSTRACT

A radio unit for unsynchronized Time Division Duplex (TDD) multi-band operation in a wireless communication system. The radio unit comprises a first resonator arrangement comprising one or more resonators tuned for operating at a first frequency band. A first terminal of the first resonator arrangement is coupled to an antenna element. The radio unit further comprises a second resonator arrangement comprising one or more resonators tuned for operating at a second frequency band. A first terminal of the second resonator arrangement is coupled to the antenna element. The radio unit further comprises a tunable resonator arrangement comprising at least four tunable resonators. The at least four tunable resonators in the tunable resonator arrangement are tuned according to different operating modes.

14 Claims, 4 Drawing Sheets

(56) References Cited

U.S. PATENT DOCUMENTS

2017/0033815 A1* 2/2017 Leipold ............... H04B 1/0057
2017/0077983 A1   3/2017 Ella et al.

OTHER PUBLICATIONS

Iman Mandal et al., "Synthesis of Dual-Band Microwave Duplexers," 2013, 4 pages, Texas Symposium on Wireless and Microwave Circuits and Systems (WMCS).
International Preliminary Report on Patentability, PCT App. No. PCT/SE2018/050858, dated Mar. 11, 2021, 8 pages.
Supplementary European Search Report and Search Opinion, EP App. No. 18931876.9, dated Mar. 4, 2022, 11 pages.

* cited by examiner

RADIO UNIT FOR UNSYNCHRONIZED TDD MULTI-BAND OPERATION

CROSS-REFERENCE TO RELATED APPLICATIONS

This application is a National stage of International Application No. PCT/SE2018/050858, filed Aug. 27, 2018, which is hereby incorporated by reference.

TECHNICAL FIELD

Embodiments herein relate to a radio unit for unsynchronized Time Division Duplex (TDD) multi-band operation in a wireless communication system. In particular, the embodiments herein relate to a radio unit comprising multiple tunable resonators tuned according to different operating modes, and radio apparatus or electronic apparatus comprising said radio unit.

BACKGROUND

TDD multi-band operation will be a key radio access technology for the next or $5^{th}$ generation (5G) New Radio (NR) system, especially for high frequency band operation. Radio frequency (RF) technologies is mature enough to allow a base station (BS) to support simultaneous multi-band (MB) transmission and/or reception through a common radio unit. Thus using one common radio hardware to support multi-band operation is a key enabler for 5G market, both for User Equipment (UE) and BSs. The most important feature of an MB BS is to support dynamic power sharing between different bands and hence allow operators more flexibility in network deployment. From a site engineering point of view, an MB BS may reduce installation complexity for different bands at the same site. Furthermore, the MB BS can reduce insertion loss for an antenna sharing multi-band scenario since no combiner is needed.

5G NR is being developed with three broad use case families in mind: enhanced mobile broadband (eMBB), massive machine-type communications (mMTC) and ultra-reliable low-latency communications (URLLC). The eMBB supports high capacity and high mobility, e.g. up to 500 km/h radio access with 4 ms user plane latency. The URLCC provides urgent and reliable data exchange with 0.5 ms user plane latency. 5G NR also supports infrequent, massive, and small packet transmissions for mMTC with 10 s latency.

NR frame structure supports TDD and Frequency Division Duplex (FDD) transmissions and operation in both licensed and unlicensed spectrum. The NR physical layer has extremely flexible and scalable design to support diverse use cases with extreme requirements.

To immediately allocate resources for URLLC when urgent data arrives, orthogonal frequency-division multiplexing (OFDM) symbols in a time slot must be able to be all downlink (DL), all uplink (UL), or at least one downlink part and at least one uplink part. Therefore, the time-division multiplexing (TDM) scheme in NR is much more flexible than that in Long Term Evolution (LTE).

For 5G TDD MB, to support diverse use cases, it is vital to have unsynchronized MB TDD. That is different frequency bands may have different UL/DL time slot configurations. Flexible TDD UL/DL scheduling is a key feature in 5G NR. However in the case where the operation is unsynchronized between the multi bands, receiver (RX) and transmitter (TX) operate simultaneously, which requires isolation between RX and TX at an order of 100 dB, otherwise the TX spurious emission in one band will bury weak wanted RX signal in other bands.

For current single-band LTE TDD operation, the isolation is achieved by turning the transmitter off in conjunction with high quality switches as well other schemes. For MB unsynchronized TDD operation, the transmitter cannot be turned off.

Currently there is no good solution to handle unsynchronized TDD bands by sharing the same radio hardware.

SUMMARY

It is an object of embodiments herein to provide a radio unit which can support unsynchronized TDD multi-band operation in a wireless communication system.

According to one aspect of embodiments herein, the object is achieved by a radio unit for unsynchronized TDD multi-band operation in a wireless communication system. The radio unit comprises a first resonator arrangement comprising one or more resonators tuned for operating at a first frequency band. A first terminal of the first resonator arrangement is coupled to an antenna element.

The radio unit further comprises a second resonator arrangement comprising one or more resonators tuned for operating at a second frequency band. A first terminal of the second resonator arrangement is coupled to the antenna element.

The radio unit further comprises a tunable resonator arrangement comprising at least four tunable resonators. First terminals of the first and second tunable resonators are coupled to a second terminal of the first resonator arrangement, first terminals of the third and fourth tunable resonators are coupled to a second terminal of the second resonator arrangement, second terminals of the second and third tunable resonators are coupled to a receiving frontend, second terminals of the first and fourth tunable resonators are coupled to a transmitting frontend. The at least four tunable resonators in the tunable resonator arrangement are tuned according to different operating modes.

According to one aspect of embodiments herein, the object is achieved by a radio apparatus or an electronic apparatus, comprising one or more radio units described above. The radio or electronic apparatus may be a radio base station or a wireless communication device for a cellular communication system.

The radio unit according to the embodiments herein has high performance since the tunable resonator arrangement comprising multiple tunable resonators is used. So there is no need for any TDD switch. The quality (Q) value of the tunable resonators is high, so the insertion loss is low for both DL and UL signals. The tunable resonators are tuned according to different operating modes, i.e. tuned to resonate at a certain frequency band or resonate away from a certain frequency band, to mitigate one band transmitting spurious emission to other receiving bands and mitigate transmitting signal leakage to this receiving band. It has better sensitivity and less power consumption.

The radio unit according to the embodiments herein supports both unsynchronized MB TDD and general TDD by one common radio hardware, e.g. the receiving and transmitting frontend. Compared with synchronized MB operation, each frequency band can reach a relatively high performance, and have increased flexibility and reduced dependence. This is important for 5G NR. Due to that multiband RF signals are amplified in the same transmitting frontend, different bands may dynamically share output power of a power amplifier, whereby the size, weight and cost of the radio or electronic apparatus products using the radio unit may be reduced. Furthermore, the power consumption may be reduced as well.

Therefore, the embodiments herein provide a radio unit which can support unsynchronized TDD multi-band operation in a wireless communication system with improved performance on flexibility, power consumption as well as product cost and size.

BRIEF DESCRIPTION OF THE DRAWINGS

Solutions of embodiments herein are described in more detail with reference to attached drawings in which.

DETAILED DESCRIPTION

As part of developing embodiments herein, a switch network for TDD operation and requirements on isolation for inter-band unsynchronized operation will be discussed first.

Figure 1:
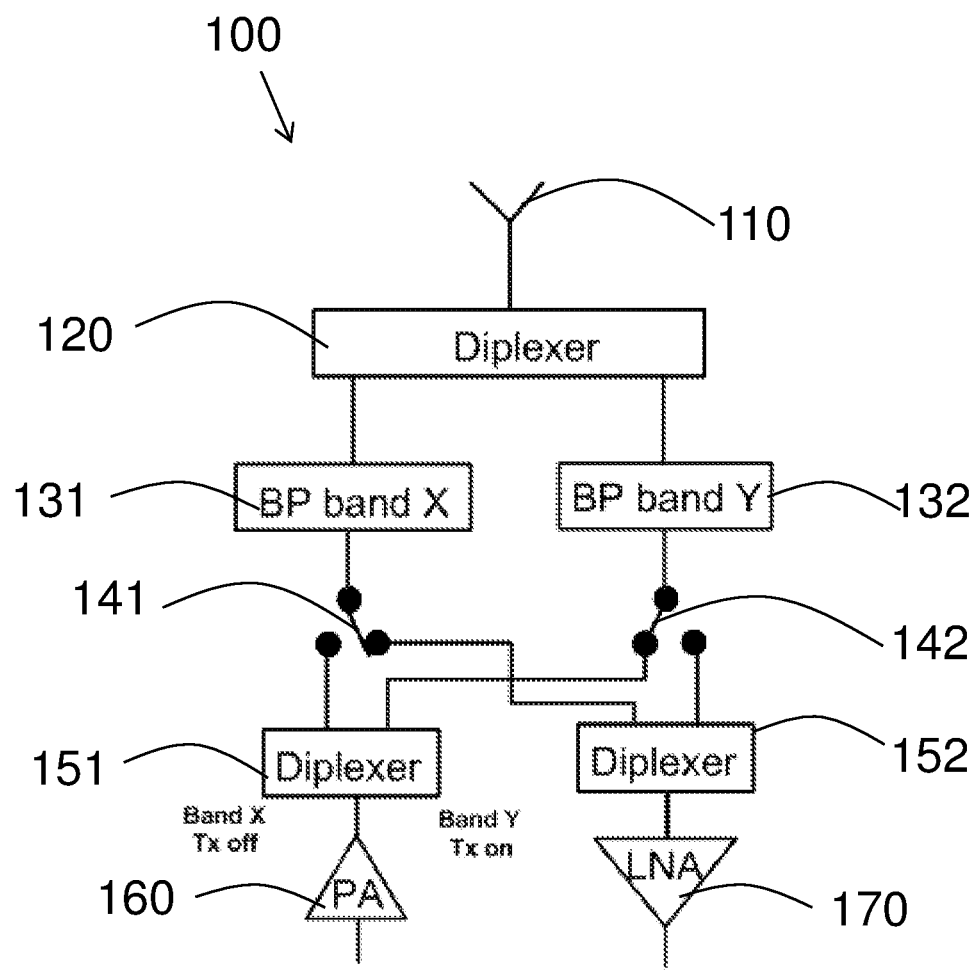
FIG. 1 is a functional block diagram of a switch network according to prior art solution.

FIG. 1 shows a switch network 100 according to prior art. The switch network 100 comprises an antenna 110, an antenna diplexer 120, a first band-pass filter 131 for operating at a first band X, a second band-pass filter 132 for operating at a second band Y, a first band switch 141, a second band switch 142, a transmitting diplexer 151, a receiving diplexer 152, a power amplifier (PA) 160, and a low noise amplifier (LNA) 170.

For MB unsynchronized operation, transmitter cannot be turned off. For example, when band Y is in transmitting (TX) mode, band X is in receiving (RX) mode, the PA 160 is on. Transmitted signal in one carrier will not be confined into this carrier but also leak into neighboring carriers or frequency bands due to impairments in transmitter circuits. Normally, this leakage is much smaller than the transmitted signal, but the leakage may still be large compared to a weak signal potentially received by a receiver. Therefore spurious emission from PA 160 may cause blocking or desensitization of the LNA 170. To achieve needed isolation, e.g. 100 dB, between the transmitter and receiver, the first and second band switches 141, 142 must be special, expensive and high quality switches.

Figure 2:
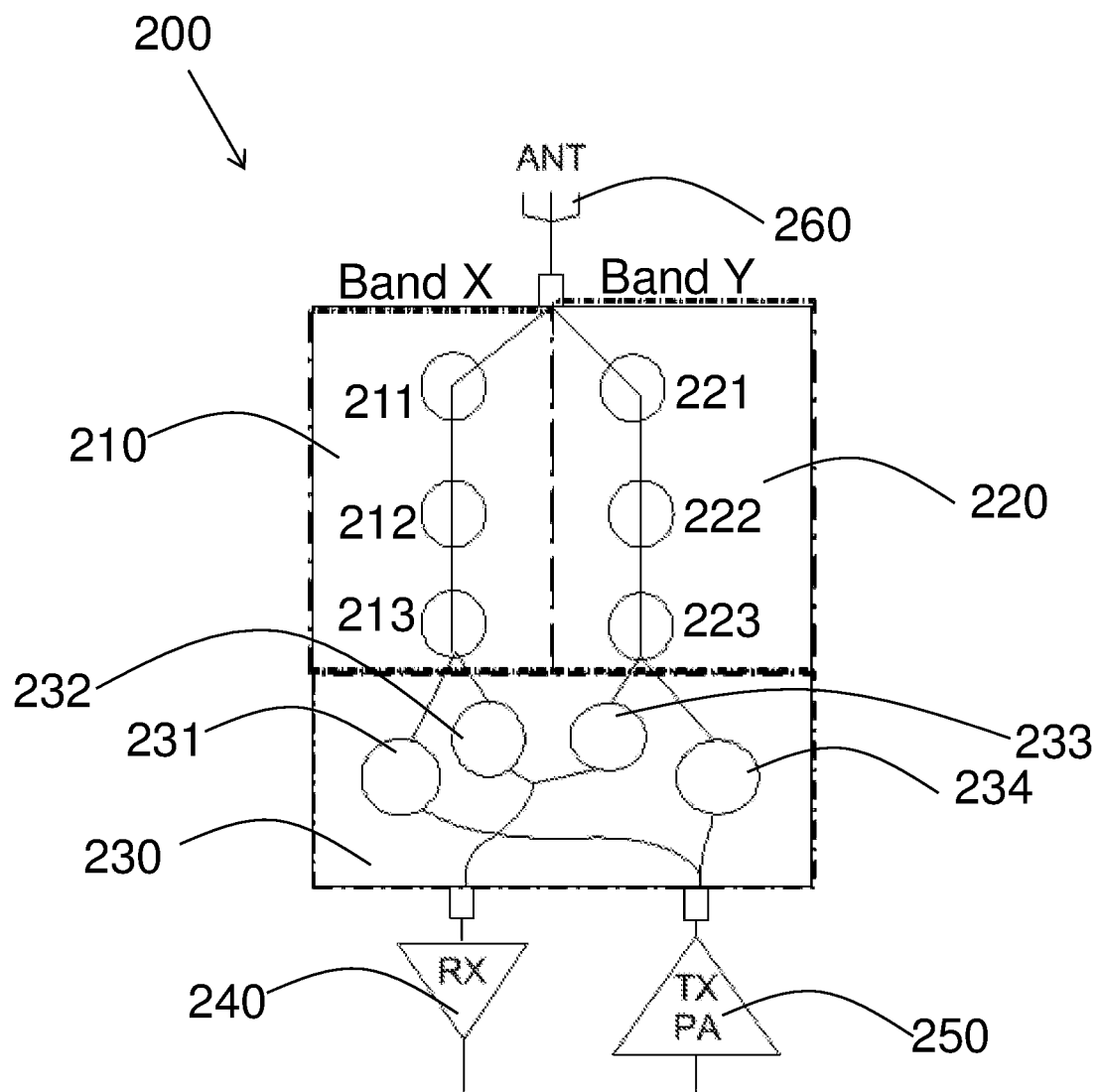
FIG. 2 is a general schematic block diagram illustrating an example of a radio unit according to embodiments herein.

FIG. 2 is block diagram showing a radio unit 200 according to embodiments herein for unsynchronized TDD multi-band operation in a wireless communication system. As illustrated in FIG. 2, the radio unit 200 comprises a first resonator arrangement 210, e.g. a first cavity filter, comprising one or more resonators 211, 212, 213 tuned for operating at a first frequency band X. A first terminal of the first resonator arrangement 210 is coupled to an antenna element 260.

The radio unit 200 further comprises a second resonator arrangement 220, e.g. a second cavity filter, comprising one or more resonators 221, 222, 223 tuned for operating at a second frequency band Y. A first terminal of the second resonator arrangement 220 is coupled to the antenna element 260.

The radio unit 200 further comprises a tunable resonator arrangement 230 comprising at least four tunable resonators 231, 232, 233, 234, e.g. tunable cavity filters. First terminals of the first and second tunable resonators 231, 232 are coupled to a second terminal of the first resonator arrangement 210, first terminals of the third and fourth tunable resonators 233, 234 are coupled to a second terminal of the second resonator arrangement 220, second terminals of the second and third tunable resonators 232, 233 are coupled to a receiving frontend 240, second terminals of the first and fourth tunable resonators 231, 234 are coupled to a transmitting frontend 250.

The at least four tunable resonators 231, 232, 233, 234 in the tunable resonator arrangement 230 are tuned according to different operating modes.

The block diagram in FIG. 2 is an illustration from architecture point of view. It shall be noticed that one cavity filter in the diagram may physically be composed of one or several cavities.

Figure 3:
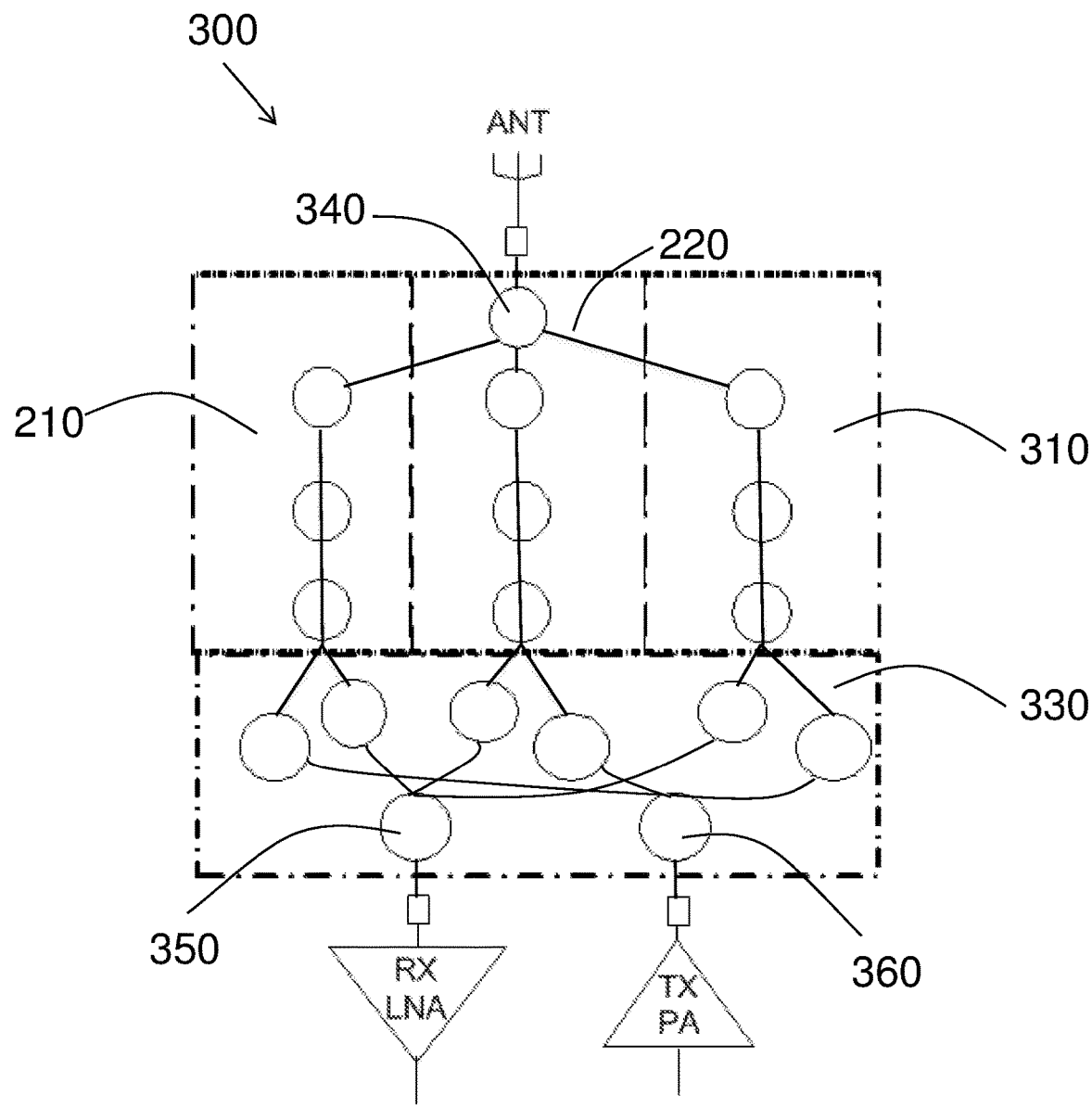
FIG. 3 is a general schematic block diagram illustrating another example of a radio unit according to embodiments herein.

Although the block diagram shows an example of dual bands, the radio unit 200 may comprises a third or more resonator arrangements in parallel with the first and second resonator arrangements 210, 220, as shown a radio unit 300 in FIG. 3, where a third resonator arrangement 310 is shown in parallel with the first and second resonator arrangements 210, 220. The third resonator arrangement 310 comprises one or more resonators tuned for operating at a certain frequency band. The tunable resonator arrangement 230 now denoted as 330 may then comprise at least six or more tunable resonators and are tuned according to different operating modes. According to some embodiments herein, there may be a common cavity filter 340 at the antenna element side to combine or split signals from the resonator arrangements 210, 220, 310, a common cavity filter 350 at the receiving frontend side and a common cavity filter 360 at the transmitting frontend side to combine or split signals from the tunable resonators in the tunable resonator arrangement 330. The radio units 200, 300 are applicable for LTE and NR, and are applicable for both BSs and UE.

The radio unit 200, 300 according to the embodiment herein uses tunable filters to realize, or achieve, the isolation between transmitting and receiving for each individual band, at the same time uses the tunable filter to realize isolation from one band in transmitting mode to the other bands in receiving mode. Resonators 211, 212, 213 are dedicated for band X, resonators 221, 222, 223 are dedicated for band Y. Resonators 211, 212, 213, 221, 222, 223 frequency responses may already be tuned respectively for fixed frequencies in production or guaranteed by designers. They may not need to be re-tuned, and may be fixed cavity filters.

For tunable resonators 231, 232, 233, 234, their frequency responses may be re-tuned according to DL or UL time slots during operation. These tunable resonators realize isolation between transmitting and receiving for each individual band, and at the same time to realize isolation from one band transmitting to the other band receiving. This makes sure that LNA performance in the receiving frontend 240 will not get any visible degradation from PA output in the transmitting frontend 250. The output from the PA may be PA noise floor, PA nonlinear products, PA output signals from all other RF transmitting bands etc. Normally the PA output noise floor is much higher than the LNA input noise, therefore measures may be taken to protect the LNA.

Depending on different frequency bands, e.g. band X and band Y, working at UL or DL time slot, the radio unit may operate in different modes.

Mode 1: Transmitting (TX) only mode. In this mode, both the first band X and the second band Y work at transmitting mode, e.g. DL time slot for BS, or UL time slot for UE. The tunable resonators 231, 232, 233, 234 are tuned in the following way:

The first tunable resonator 231 is tuned to resonate at the first frequency band X;

The fourth tunable resonator 234 is tuned to resonate at the second frequency band Y;

The second tunable resonator 232 is tuned to resonate at other frequency than the first frequency band X, i.e. to resonate away from the first frequency band X. This means that this resonator may have two resonate frequencies, one is resonate at band X, another is resonate to another frequency such as 2*X frequency to protect LNA in the receiving frontend 240;

The third tunable resonator 233 is tuned to resonate away from the second frequency band Y to protect LNA in the receiving frontend 240.

Mode 2: Receiving (RX) mode only mode. In this mode, both the first band X and the second band Y work at receiving mode, e.g. UL time slot for BS, or DL time slot for UE. The tunable resonators 231, 232, 233, 234 are tuned in the following way:

The second tunable resonator 232 is tuned to resonate at the first frequency band X;

The third tunable resonator 233 is tuned to resonate at the second frequency band Y;

The first tunable resonator 231 is tuned to resonate away from the first frequency band X to isolate the transmitting frontend 250 from receiving band X signals from the antenna element 260.

The fourth tunable resonator 234 is tuned to resonate away from the second frequency band Y to isolate the transmitting frontend 250 from receiving band Y signals from the antenna element 260.

Mode 3: Transmitting and receiving (TX/RX) mode. In this mode, one band works at receiving mode, e.g. UL time slot for BS, or DL time slot for UE, while the other band works at transmitting mode, e.g. DL time slot for BS, or UL time slot for UE. This mode dimensions the isolation requirement. As shown in FIG. 1, it may need around 100 dB isolation from one band TX to the other band RX.

According to some embodiments herein, when the first band X works at RX mode, while the second band Y works at TX mode, the tunable resonators 231, 232, 233, 234 are tuned in the following way:

The second tunable resonator 232 is tuned to resonate at the first frequency band X;

The fourth tunable resonator 234 is tuned to resonate at the second frequency band Y;

The first tunable resonator 231 is tuned to resonate away from the first and the second frequency bands to mitigate band Y TX spurious emission leakage to band X receiver and to mitigate band Y TX signal leakage to band X receiver;

The third tunable resonator 233 is tuned to resonate away from the first and the second frequency bands to mitigate band Y TX spurious emission leakage to band X receiver and to mitigate band Y TX signal leakage to band X receiver.

TX signal leakage here means that the leakage signal has the same frequency as the transmitting signal. TX spurious emission leakage here means that the leakage signal is not the same as the transmitting signal, i.e. the frequency of the spurious emission is different compare to the transmitting signal.

According to some embodiments herein, when the first band X works at TX mode, while the second band Y works at RX mode, the tunable resonators 231, 232, 233, 234 are tuned in the following way:

The first tunable resonator 231 is tuned to resonate at the first frequency band X;

The third tunable resonator 233 is tuned to resonate at the second frequency band Y;

The second tunable resonator 232 is tuned to resonate away from the first and the second frequency bands to mitigate band X TX spurious emission leakage to band Y receiver and to mitigate band X TX signal leakage to band Y receiver;

The fourth tunable resonator 234 is tuned to resonate away from the first and the second frequency second bands to mitigate band X TX spurious emission leakage to band Y receiver and to mitigate band X TX signal leakage to band Y receiver.

To realize around 100 dB isolation, several physical tunable cavities may be needed for the first and third tunable resonators 231, 233.

The number of fixed cavity that may be needed in each of the first and second resonator arrangements 210, 229 for each band may depend on the TX and RX out of band rejection requirements.

According to some embodiments herein, the tunable resonators 231, 232, 233, 234 may be implemented by cavity filters, Varactor diodes, P-Intrinsic-N (PIN) diodes and microelectromechanical systems (MEMS) switches. A combined switch and capacitor may also be used.

The radio unit 200 according to embodiments herein is applicable for unsynchronized MBs TDD operation. It uses tunable filters to mitigate one band TX spurious emission leakage to the other bands RX. Compared with the synchronized MB TDD operation, each frequency band may reach a relatively high performance, and have increased flexibility and reduced dependence. Note that most of the frequency bands for 5G NR are TDD frequency bands.

The radio unit 200 according to embodiments herein is also applicable for general TDD operation. It replaces TDD switches with tunable filters, to mitigate one band TX signal leakage to this band RX.

The radio unit 200 according to embodiments herein may reach high performance since tunable resonators e.g. cavity filters are used, no need for TDD switches. The Q value of the tunable resonators is high, so the insertion loss is low for both DL and UL signals.

The radio unit 200 according to embodiments herein has better sensitivity and less power consumption.

Figure 4:
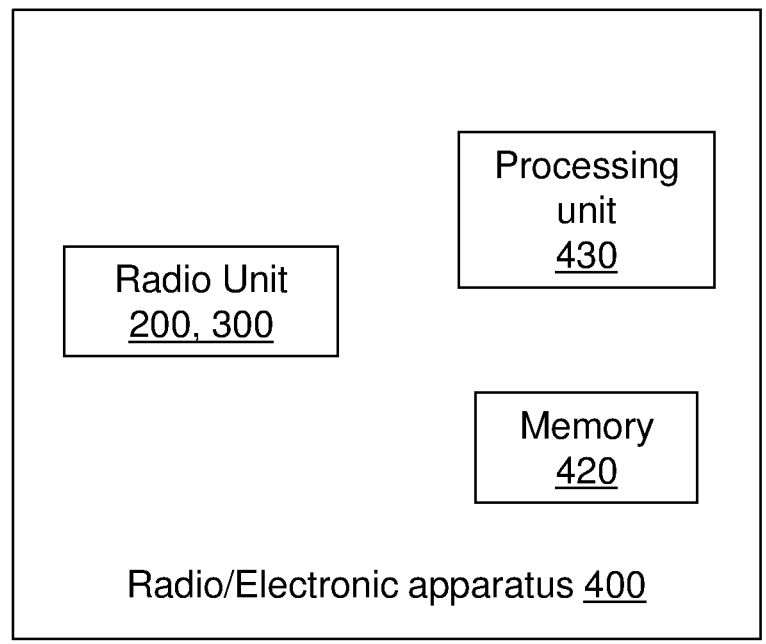
FIG. 4 is a block diagram illustrating a radio or electronic apparatus in which embodiments herein may be implemented.

The radio unit 200, 300 according to the embodiments herein may be employed in various radio or electronic apparatuses. FIG. 4 shows a block diagram of a radio or electronic apparatus 400. The radio or electronic apparatus 400 comprises one or more radio units 200, 300. The radio or electronic apparatus 400 may be a radio base station or a wireless communication device, e.g. a user equipment or a mobile device, for a cellular communications system/network. The radio or electronic apparatus 400 may comprise other units, such as a memory 420 and a processing unit 430 as shown in FIG. 4.

Those skilled in the art will understand that the radio unit 200, 300 according to embodiments herein may be implemented by any technology not limited by semiconductor.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A radio unit for unsynchronized Time Division Duplex (TDD) multi-band operation in a wireless communication system, the radio unit comprising:
 a first resonator arrangement comprising one or more resonators tuned for operating at a first frequency band, wherein a first terminal of the first resonator arrangement is coupled to an antenna element; and
 a second resonator arrangement comprising one or more resonators tuned for operating at a second frequency band, wherein a first terminal of the second resonator arrangement is coupled to the antenna element; and
 a tunable resonator arrangement comprising a first tunable resonator, a second tunable resonator, a third tunable resonator, a fourth tunable resonator, wherein:
  first terminals of the first and second tunable resonators are coupled to a second terminal of the first resonator arrangement;
  first terminals of the third and fourth tunable resonators are coupled to a second terminal of the second resonator arrangement;
  second terminals of the second and third tunable resonators are coupled to a receiving frontend,
  second terminals of the first and fourth tunable resonators are coupled to a transmitting frontend; and
  the first, second, third and fourth tunable resonators in the tunable resonator arrangement are tuned according to different operating modes.

2. The radio unit according to claim 1, wherein:
 the first tunable resonator is tuned to resonate at the first frequency band;
 the fourth tunable resonator is tuned to resonate at the second frequency band;
 the second tunable resonator is tuned to resonate away from the first frequency band; and
 the third tunable resonator is tuned to resonate away from the second frequency band.

3. The radio unit according to claim 1, wherein:
 the second tunable resonator is tuned to resonate at the first frequency band;
 the third tunable resonator is tuned to resonate at the second frequency band;
 the first tunable resonator is tuned to resonate away from the first frequency band; and
 the fourth tunable resonator is tuned to resonate away from the second frequency band.

4. The radio unit according to claim 1, wherein:
 the second tunable resonator is tuned to resonate at the first frequency band;
 the fourth tunable resonator is tuned to resonate at the second frequency band;
 the first tunable resonator is tuned to resonate away from the first frequency band and the second frequency band; and
 the third tunable resonator is tuned to resonate away from the first frequency band and the second frequency band.

5. The radio unit according to claim 1, wherein:
 the first tunable resonator is tuned to resonate at the first frequency band;
 the third tunable resonator is tuned to resonate at the second frequency band;
 the second tunable resonator is tuned to resonate away from the first frequency band and the second frequency band; and
 the fourth tunable resonator is tuned to resonate away from the first frequency band and the second frequency second band.

6. The radio unit according to claim 1, further comprising a third resonator arrangement in parallel with the first and second resonator arrangements, wherein the third resonator arrangement comprises one or more resonators tuned for operating at a certain frequency band, and wherein the tunable resonator arrangement, comprising at least six tunable resonators, are tuned according to different operating modes.

7. The radio unit according to claim 1, in which the radio unit is one of a plurality of radio units of a radio apparatus.

8. An electronic apparatus for unsynchronized Time Division Duplex (TDD) multi-band operation in a wireless communication system, the electronic apparatus comprising:
 a first resonator arrangement comprising one or more resonators tuned for operating at a first frequency band, wherein a first terminal of the first resonator arrangement is coupled to an antenna element; and
 a second resonator arrangement comprising one or more resonators tuned for operating at a second frequency band, wherein a first terminal of the second resonator arrangement is coupled to the antenna element; and
 a tunable resonator arrangement comprising a first tunable resonator, a second tunable resonator, a third tunable resonator, a fourth tunable resonator, wherein:
  first terminals of the first and second tunable resonators are coupled to a second terminal of the first resonator arrangement;
  first terminals of the third and fourth tunable resonators are coupled to a second terminal of the second resonator arrangement;
  second terminals of the second and third tunable resonators are coupled to a receiving frontend;
  second terminals of the first and fourth tunable resonators are coupled to a transmitting frontend; and
  the first, second, third and fourth tunable resonators in the tunable resonator arrangement are tuned according to different operating modes.

9. The electronic apparatus according to claim 8, wherein the electronic apparatus is a radio base station or a wireless communication device for a cellular communication system.

10. The electronic apparatus according to claim 8, wherein:
 the first tunable resonator is tuned to resonate at the first frequency band;
 the fourth tunable resonator is tuned to resonate at the second frequency band;
 the second tunable resonator is tuned to resonate away from the first frequency band; and
 the third tunable resonator is tuned to resonate away from the second frequency band.

11. The electronic apparatus according to claim 8, wherein:
 the second tunable resonator is tuned to resonate at the first frequency band;
 the third tunable resonator is tuned to resonate at the second frequency band;
 the first tunable resonator is tuned to resonate away from the first frequency band; and
 the fourth tunable resonator is tuned to resonate away from the second frequency band.

12. The electronic apparatus according to claim 8, wherein:
- the second tunable resonator is tuned to resonate at the first frequency band;
- the fourth tunable resonator is tuned to resonate at the second frequency band;
- the first tunable resonator is tuned to resonate away from the first frequency band and the second frequency band; and
- the third tunable resonator is tuned to resonate away from the first frequency band and the second frequency band.

13. The electronic apparatus according to claim 8, wherein:
- the first tunable resonator is tuned to resonate at the first frequency band;
- the third tunable resonator is tuned to resonate at the second frequency band;
- the second tunable resonator is tuned to resonate away from the first frequency band and the second frequency band; and
- the fourth tunable resonator is tuned to resonate away from the first frequency band and the second frequency band.

14. The electronic apparatus according to claim 8, further comprising a third resonator arrangement in parallel with the first and second resonator arrangements, wherein the third resonator arrangement comprises one or more resonators tuned for operating at a certain frequency band, and wherein the tunable resonator arrangement, comprising at least six tunable resonators, are tuned according to different operating modes.

* * * * *